(12) United States Patent
Ross

(10) Patent No.: US 9,600,137 B2
(45) Date of Patent: Mar. 21, 2017

(54) PROVIDING SELECTION AREAS FOR SELECTABLE OBJECTS IN GRAPHICAL INTERFACE

(71) Applicant: Adobe Systems Incorporated, San Jose, CA (US)

(72) Inventor: Nathan Carl Ross, Highland, UT (US)

(73) Assignee: Adobe Systems Incorporated, San Jose, CA (US)

( * ) Notice: Subject to any disclaimer, the term of this patent is extended or adjusted under 35 U.S.C. 154(b) by 749 days.

(21) Appl. No.: 13/944,559

(22) Filed: Jul. 17, 2013

(65) Prior Publication Data

US 2015/0026637 A1   Jan. 22, 2015

(51) Int. Cl.
*G06F 3/0481*   (2013.01)
*G06T 15/30*   (2011.01)

(52) U.S. Cl.
CPC ............ *G06F 3/0481* (2013.01); *G06T 15/30* (2013.01); *G06T 2210/22* (2013.01)

(58) Field of Classification Search
CPC .... G06F 3/0481; G06T 15/30; G06T 2210/22
See application file for complete search history.

(56) References Cited

U.S. PATENT DOCUMENTS 5,757,358 A * 5/1998 Osga .................. G06F 3/04842
              345/157
6,374,272 B2 * 4/2002 Bates ........................... 345/156

OTHER PUBLICATIONS

Burns, Jared (2009), "Centroidal Voronoi Tessellations", 2009, https://www.whitman.edu/Documents/Academics/Mathematics/burns.pdf.*

* cited by examiner

*Primary Examiner* — Michelle L Sams
(74) *Attorney, Agent, or Firm* — Kilpatrick Townsend & Stockton LLP

(57) ABSTRACT

In some embodiments, a processor accesses electronic content that includes multiple selectable objects that are renderable in a graphical interface. The processor generates multiple selection areas respectively associated with the selectable objects. An input to the graphical interface received within each selection area selects an associated selectable object. Generating the selection areas includes generating a boundary around at least one of the selectable objects. Any point within the boundary is closer to the associated selectable object than any other selectable object. Generating the selection areas also includes clipping the boundary to define the selection area for the selectable object. The processor adds the selection areas to a document object model associated with the electronic content. The document object model is usable for rendering the graphical interface with the selectable objects and identifying the selection areas.

22 Claims, 6 Drawing Sheets

PROVIDING SELECTION AREAS FOR SELECTABLE OBJECTS IN GRAPHICAL INTERFACE

TECHNICAL FIELD

This disclosure relates generally to computer-implemented methods and systems and more particularly relates to providing selection areas for selectable objects in a graphical interface.

BACKGROUND

Graphical interfaces for computing applications may include selectable objects that can receive input via a touch screen or a mouse. For example, a user may use a mouse click or a touch input to select a data point on a chart in order to see detailed information for the selected data point.

Some display devices, such as smart phones and tablet computers, may render selectable objects with small sizes. Smaller selectable objects may be difficult to select on a touch screen. Prior solutions for addressing this problem may involve drawing invisible selection areas around the selectable objects that can receive touch inputs for the enclosed selectable objects. For example, touch inputs within a given selection radius of a button in a graphical interface may select the button.

Such prior solutions present disadvantages, such as larger selection areas overlapping one another. For example, FIG. 1 is a modeling diagram depicting overlap between different selection areas defined by a fixed selection radius. As depicted in FIG. 1, a graphical interface 100 can include selectable objects 102a-c having selection areas 104a-c respectively defined by boundaries 106a-c. The boundaries 106a-c, which are depicted in FIG. 1 for descriptive purposes, may not be rendered in the graphical interface 100. Each of the boundaries 106a-c may be defined by a fixed selection radius 108. The selection radius 108 may be greater than the distance between two of the selectable objects 102b, 102c. The selection radius 108 being greater than the distance between the selectable objects 102b, 102c may cause an overlap in the selection areas 104b, 104c. The overlap in the selection areas 104b, 104c may prevent or hinder a processor from determining if a touch input to the overlapping area is intended to select the object 102b or the object 102c. The overlap in the selection areas 104b, 104c may also cause a touch input to the overlapping area to select the object 102b rather than the object 102c if the selection area 104b is identified after the selection area 104c is identified.

Other prior solutions may involve using only one of the x or y coordinates of a touch input and selecting a column or row of points or other selectable objects along the x or y coordinate of the touch input. Such solutions may be of limited utility for documents such as scatter plots having selectable points that may not be aligned vertically or horizontally.

SUMMARY

One embodiment involves a processor accessing electronic content that includes multiple selectable objects that are renderable in a graphical interface. The embodiment further involves generating multiple selection areas respectively associated with the selectable objects. An input to the graphical interface received within each selection area selects a respective selectable object associated with the selection area. Generating the selection areas includes generating a boundary around at least one of the selectable objects. Any point within the boundary is closer to the associated selectable object than any other selectable object. Generating the selection areas also includes clipping the boundary to define the selection area for the selectable object. The embodiment also involves adding the selection areas to a document object model associated with the electronic content. The document object model can be used for rendering the selectable objects in the graphical interface and identifying the selection areas.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
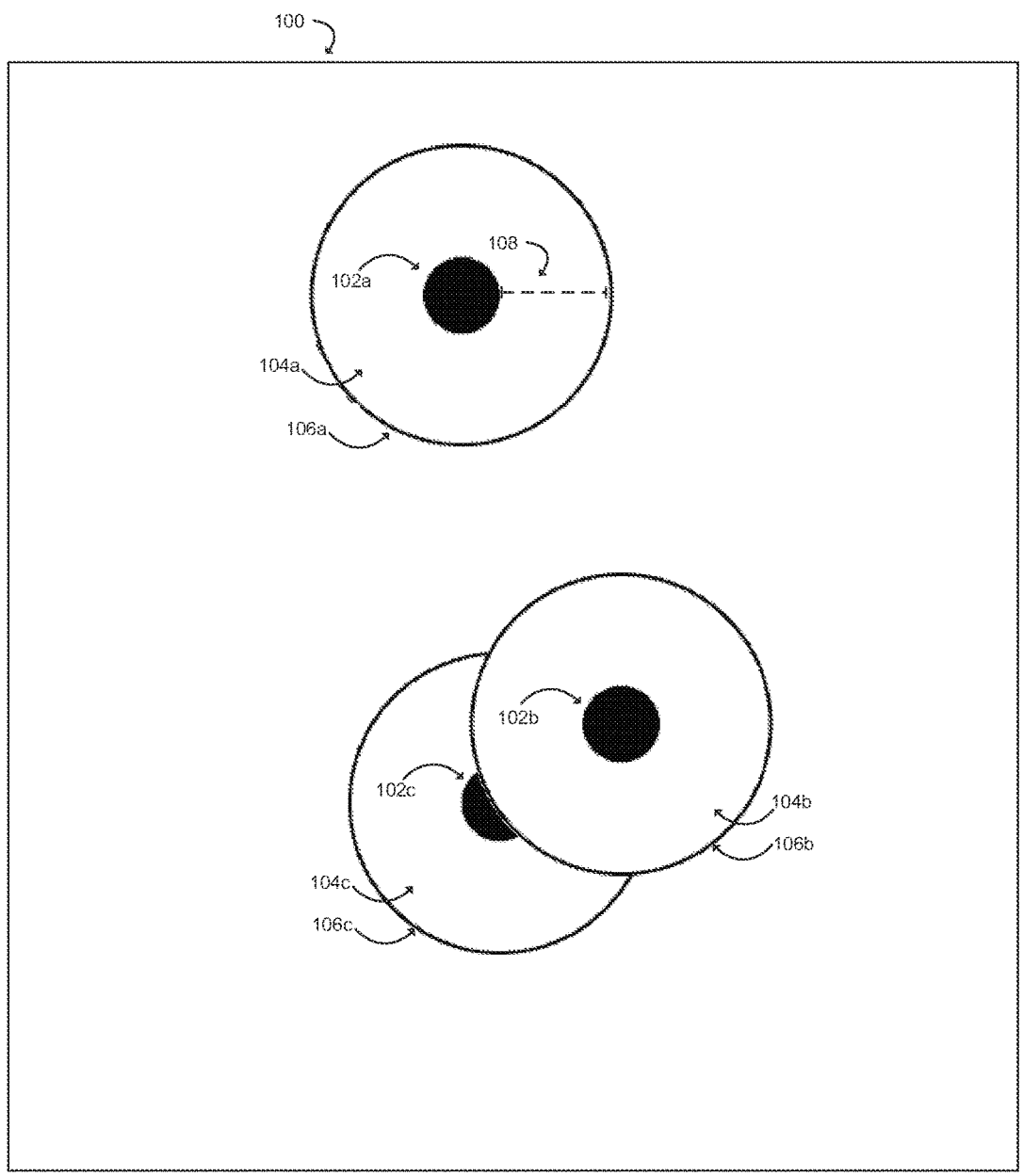
FIG. 1 is a modeling diagram depicting overlap between different selection areas defined by a fixed selection radius.

Computer-implemented systems and methods are disclosed for providing selection areas for selectable objects in a graphical interface.

The following non-limiting example is provided to help introduce the general subject matter of certain embodiments. A software module can access a document having multiple selectable objects. For example, the document may be a scatter plot having data points that can be clicked or otherwise selected to display detailed information related to the data points. The software module can automatically partition a space including the selectable data points such that each data point is enclosed by a respective boundary. A respective selection area for receiving touch inputs can be defined by each boundary. The touch inputs received in the selection area can cause the data point enclosed by the boundary to be clicked or otherwise selected. The process for automatically partitioning the space may generate boundaries that define oversized selection areas. For example, the automatically partitioned space may generate a selection area that can receive a touch input at a distance from an enclosed data point that is not intuitive to a user. The software module can reduce the size of the oversize selection areas by clipping the selection areas using a clipping radius. For example, if the boundary generated by the partitioning process or a portion thereof is further from an enclosed data point than the clipping radius, the boundary or boundary portion may be moved to the selection radius. If the boundary generated or a portion thereof is closer to an enclosed data point than the clipping radius, the boundary or boundary portion can be left in place. The software module can thus provide intuitively sized selection areas for selectable objects without overlap between the selection areas.

In accordance with one embodiment, a processor can access electronic content that includes multiple selectable objects that are renderable in a graphical interface. The processor can generate multiple selection areas respectively associated with the selectable objects. An input to the graphical interface received within each selection area selects a respective selectable object associated with the selection area. Generating the selection areas includes generating a respective boundary around each selectable object. Any point within the boundary is closer to the selectable object than any other selectable object. Generating the selection areas also includes clipping each boundary to define a respective selection area. For example, clipping a boundary can include positioning each point along the clipped boundary at a distance from the selectable object that is a minimum of the unclipped boundary and a clipping distance. The processor can add the selection areas to a document object model associated with the electronic content. The document object model can be used for rendering the selectable objects in the graphical interface and identifying the selection areas.

As used herein, the term "selectable object" is used to refer to an object rendered in a graphical interface that can generate an event in response to receiving an input. Non-limiting examples of selectable objects include button objects, data points in a scatter plot or other chart that can display additional information in response to a clicking input or hovering input, and the like.

As used herein, the term "selection area" is used to refer to a region of a graphical interface at least partially surrounding a selectable object that can be configured to receive the same input(s) as the selectable object surrounded by the region and generate event(s) in response to the input(s). A non-limiting example of a selection area can include a blank portion of the graphical interface around a selectable object such as a button.

As used here, the term "clipping distance" is used to refer to a distance equal to or otherwise corresponding to a radius of a clipping polygon used to clip the boundaries of a selection area. In some embodiments, a clipping distance can be a distance from a center of the clipping polygon to each vertex of the clipping polygon.

As used herein, the term "document object model" is used to refer to a platform-independent application programming interface ("API") for electronic content such as (but not limited to) HyperText Markup Language ("HTML") and Extensible Markup Language ("XML") documents. The document object model can define the logical structure of electronic content and a manner of accessing the electronic content. For example, a browser application may render electronic content using a document object model that organizes the components of the electronic content in a tree structure. The browser application can render the electronic content by parsing the document object model to identify the components included in the tree structure and the arrangement of the components when rendered for display.

In some embodiments, generating the boundaries around the selectable objects can include applying a Voronoi tessellation to a portion of the graphical interface in which selectable objects are positioned. Applying a Voronoi tessellation to a space can include dividing the space into a number of regions (i.e., "Voronoi regions") using a set of pre-specified seed points. Each seed point is positioned in a respective Voronoi region. A region for a given seed point includes all points closer to that seed point than to any other seed point. For each of the selectable objects, a respective point associated with a respective selectable object can be selected as a respective seed point of a Voronoi tessellation. In one non-limiting example, a selectable object that is a circle can be associated with a seed point that is the center of the circle. Other non-limiting examples of selectable objects include point, line, area, and bubble charts. The boundaries of the selection areas can delineate the Voronoi regions of the Voronoi tessellation. The Voronoi regions can be clipped based on the clipping distance.

In some embodiments, the clipping distance can be adjustable. In some embodiments, the clipping distance can be adjusted based on input received to an application performing the clipping operation. In other embodiments, the clipping distance can be automatically adjusted without requiring input specifying the length of the clipping distance. For example, a computing device can determine the attributes of a display device on which the graphical interface is to be displayed, such as the resolution of the display device and/or the dimensions of the display device. The computing device can increase the length of the clipping distance for higher resolutions and/or larger dimensions or decrease the length of the clipping distance for lower resolutions and/or smaller dimensions.

In additional or alternative embodiments, the clipping distance can be obtained from a clipping polygon applied to the boundaries generated for the selectable objects. A non-limiting example of a clipping polygon is a polygon in which the distance from the center of the polygon to any vertex of the polygon is constant. Clipping the boundary using a clipping polygon can include positioning each point along the boundary at a distance from the selectable object that is a minimum of a first distance from the selectable object to the boundary and a second distance from the selectable object to the edge of the clipping polygon. In some embodiments, the number of vertices for the clipping polygon can be adjustable. In some embodiments, the number of vertices can be adjusted based on input received to an application performing the clipping operation. In other embodiments, the clipping distance can be automatically adjusted without requiring input specifying the number of vertices. For example, a computing device can determine the computing resources (e.g., processing capacity and/or memory capacity) available for performing the clipping operations. The computing device can increase the number of vertices based on the computing device having a higher processing capacity and/or memory capacity.

Figure 2:
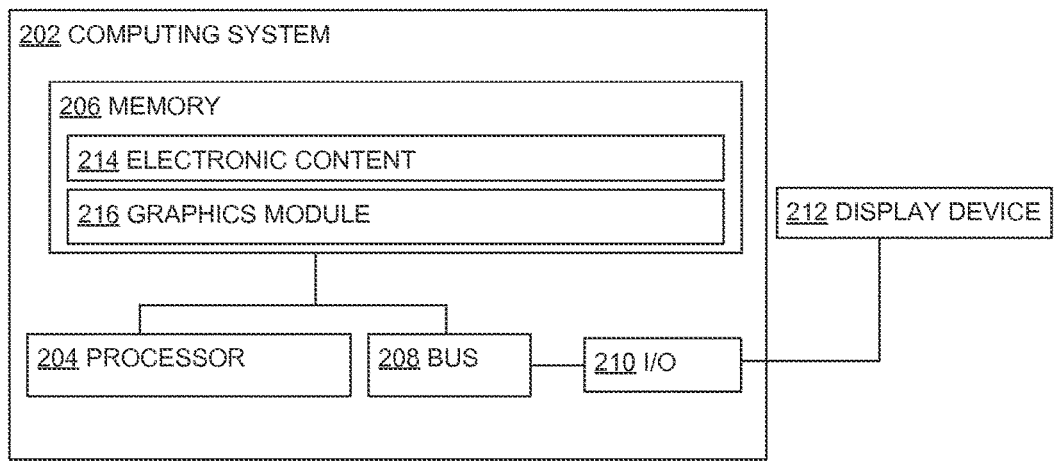
FIG. 2 is a block diagram depicting an example computing system for implementing certain embodiments.

Referring now to the drawings, FIG. 2 is a block diagram depicting an example computing system 202 for implementing certain embodiments.

The computing system 202 comprises a computer-readable medium such as a processor 204 that is communicatively coupled to a memory 206 and that executes computer-executable program instructions and/or accesses information stored in the memory 206. The processor 204 may comprise a microprocessor, an application-specific integrated circuit ("ASIC"), a state machine, or other processing device. The processor 204 can include any of a number of computer processing devices, including one. Such a processor can include or may be in communication with a computer-readable medium storing instructions that, when executed by the processor 204, cause the processor to perform the steps described herein.

The computing system 202 may also comprise a number of external or internal devices such as input or output devices. For example, the computing system 202 is shown with an input/output ("I/O") interface 210 and a display device 212. A bus 208 can also be included in the computing system 202. The bus 208 can communicatively couple one or more components of the computing system 202.

The computing system 202 can modify, access, or otherwise use electronic content 214. The electronic content 214 may be resident in any suitable computer-readable medium and execute on any suitable processor. In one embodiment, the electronic content 214 can reside in the memory 206 at the computing system 202. In another embodiment, the electronic content 214 can be accessed by the computing system 202 from a remote content provider via a data network.

The memory 206 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 216 stored in the memory 206 can configure the processor 204 to prepare the electronic content 214 for rendering in a graphical interface and/or render the electronic content 214 in the graphical interface. In some embodiments, the graphics module 216 can be a software module included in or accessible by a separate application (such as but not limited to, a browser application) executed by the processor 204 that is configured to modify, access, or otherwise use the electronic content 214. In other embodiments, the graphics module 216 can be a stand-alone application executed by the processor 204.

The computing system 202 can include any suitable computing device for executing the graphics module 216. Non-limiting examples of a computing device include a desktop computer, a tablet computer, a smart phone, a digital camera, or any other computing device suitable for rendering the electronic content 214. The computing system 202 may be a touch-screen enabled device.

Figure 3:
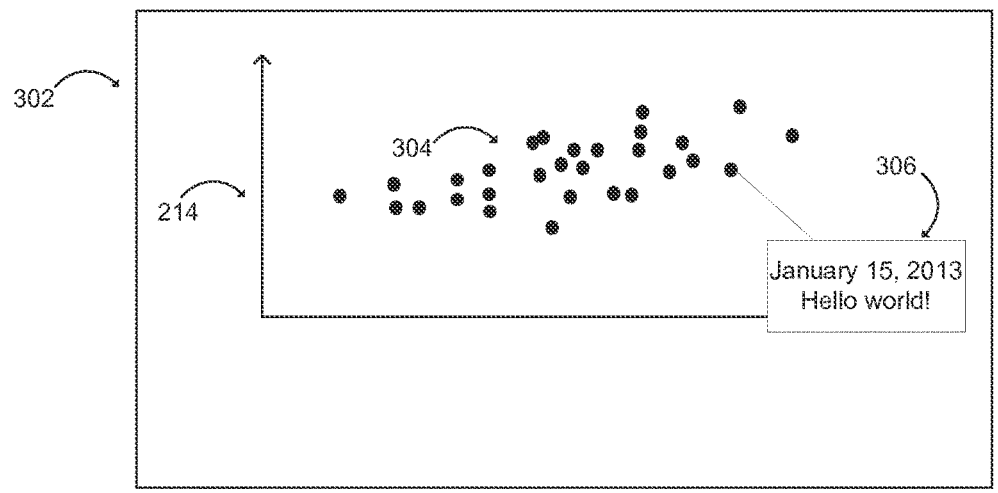
FIG. 3 is a modeling diagram depicting an example graphical interface for rendering electronic content with selectable objects.

FIG. 3 is a modeling diagram depicting an example graphical interface 302 for rendering electronic content 214 with selectable objects. The graphical interface 302 may be used to display electronic content 214. A non-limiting example of electronic content 214 is a scatter plot, as depicted in FIG. 3. A non-limiting example of a selectable object is a point on the scatter plot that can be selected to display data associated with the selected point. For example, as depicted in FIG. 3, one or more of the points of the scatter plot that are identified as selectable objects 304 can be clicked to display a pop-up 306 that includes additional information associated with the point. A selection area can include an area around each of the selectable objects. For example, in the scatter plot depicted in FIG. 3, clicking on a region of space surrounding a given point can execute the same function as clicking the point itself.

Figure 4:
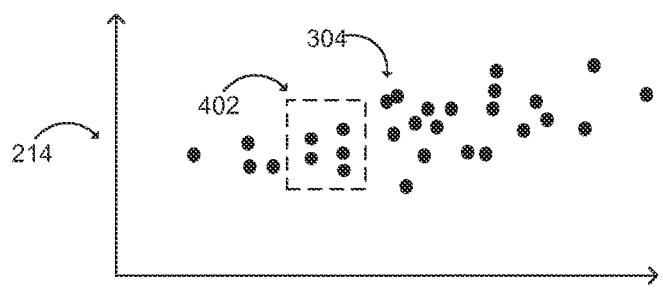
FIG. 4 is a modeling diagram depicting the electronic content with closely spaced selectable objects.

Some of the selectable objects may be closely spaced together. For example, FIG. 4 is a modeling diagram depicting the electronic content 214 with closely spaced selectable objects. The selectable objects 304 included in the portion 402 of the electronic content 214 identified by a dashed rectangle in FIG. 4 may be spaced so closely that defining selection areas via a fixed selection radius may result in overlapping selection areas between one or more of the selectable objects 304 or section area sizes too small to provide assistance in selecting the selectable objects 304.

Figure 5:
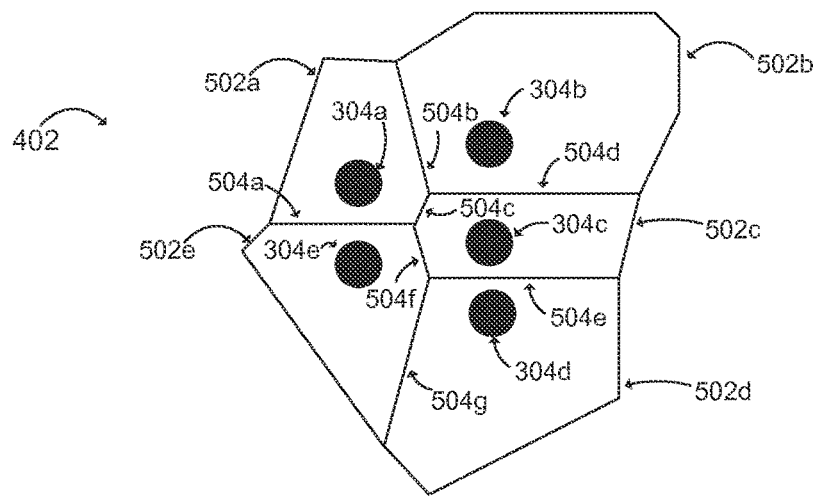
FIG. 5 is a modeling diagram depicting example initial boundaries for selection areas generated by partitioning a space in which selectable objects are positioned in a graphical interface.

FIG. 5 is a modeling diagram depicting example initial boundaries 502a-e for selection areas generated by partitioning a space in which selectable objects 304a-e are positioned in a graphical interface 302. For illustrative purposes, FIG. 5 depicts initial boundaries 502a-e for only the portion 402 of the space in which the selectable objects 304 are positioned (e.g., the scatter plot depicted in FIGS. 3-4). However, the process described below can be implemented with respect to the entirety of the space in which selectable objects are positioned and/or one or more portions of the space.

A partitioning process can be applied to the space to generate the initial boundaries 502a-e around the respective selectable objects 304a-e. The initial boundaries 502a-e can bisect a respective region between each pair of selectable objects in the partitioned space.

A non-limiting example of a partitioning process is a Voronoi tessellation. Applying a Voronoi tessellation to a space can include dividing the space into a number of regions (i.e., "Voronoi regions") using a set of pre-specified seed points. Each seed point is positioned in a respective Voronoi region. A region for a given seed point includes all points closer to that seed point than to any other seed point.

The selectable objects 304a-e can be selected as the seed points of a Voronoi tessellation. The initial boundaries 502a-e delineate the Voronoi regions of the Voronoi tessellation. The initial boundaries 502a-e can include shared boundary regions. For example, as depicted in FIG. 5, the initial boundary 502a includes a shared boundary region 504a shared with the initial boundary 502e, a shared boundary region 504b shared with the initial boundary 502b, and a shared boundary region 504c shared with the initial boundary 502c. The selectable object 304a is equidistant from the shared boundary region 504a with respect to the selectable object 304e, equidistant from the shared boundary region 504b with respect to the selectable object 304b, and equidistant from the shared boundary region 504c with respect to the selectable object 304e.

The initial boundary 502c depicted in FIG. 5 also includes a shared boundary region 504d shared with the initial boundary 502b, a shared boundary region 504e shared with the initial boundary 502d, and a shared boundary region 504f shared with the initial boundary 502e. The selectable object 304c is equidistant from the shared boundary region 504d with respect to the selectable object 304b, equidistant from the shared boundary region 504e with respect to the selectable object 304d, and equidistant from the shared boundary region 504f with respect to the selectable object 304e.

The initial boundary 502d depicted in FIG. 5 also includes a shared boundary region 504g shared with the initial boundary 502e. The selectable object 304d is equidistant from the shared boundary region 504g with respect to the selectable object 304e.

Using the initial boundaries 502a-e to delineate the selection areas can present disadvantages, such as selection areas that are too large to be used intuitively. For example, one or more of the selectable objects 304a-e may be selected in response to a cursor hovering over a selection area. A selection area delineated by the initial boundaries 502e may have a sufficient size that a cursor hovering near the edge of the selection area may result in the unwanted selection of the selectable object 304b, even though the cursor is positioned at a substantial distance from the selectable object 304b.

Figure 6:
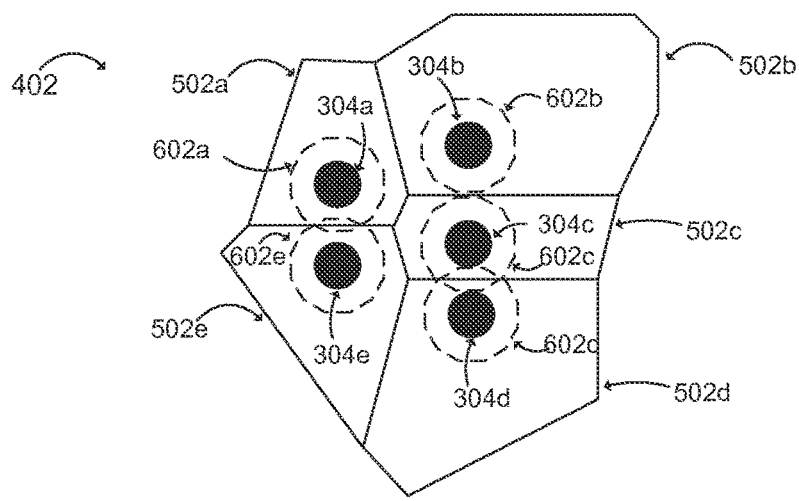
FIG. 6 is a modeling diagram depicting clipping polygons overlaying the initial boundaries for the selection areas of the selectable objects.

The selection areas delineated by the initial boundaries 502a-e can be "clipped" to provide more intuitive selection areas. For example, FIG. 6 is a modeling diagram depicting clipping polygons 602a-e overlaying the initial boundaries 502a-e for the selection areas of the selectable objects 304a-e. The example clipping polygons 602a-e are depicted as dashed lines in FIG. 6 for illustrative purposes to distinguish the clipping polygons 602a-e from the initial boundaries 502a-e. Each of the clipping polygons 602a-c can be a polygon in which the distances from the center to the vertices of the polygon are equal. For example, as depicted in FIG. 6, each of the clipping polygons 602a-c is a twelve-sided clipping polygon. The graphics module 216 can select a clipping distance that is equal to the distance from the center of the clipping polygon to any vertex of the clipping polygon.

Figure 7:
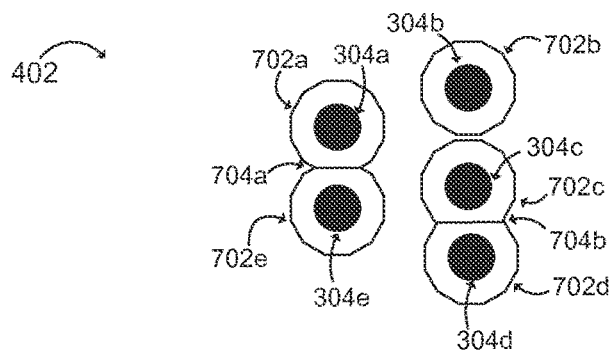
FIG. 7 is a modeling diagram depicting modified boundaries generated by clipping the initial boundaries using the clipping polygons.

The clipping polygons 602a-c can be used to modify the initial boundaries 502a-e to generate modified boundaries that surround the selectable objects without generating overlapping selection areas. FIG. 7 is a modeling diagram depicting modified boundaries 702a-e generated by clipping the initial boundaries 502a-e using the clipping polygons 602a-e. The graphics module 216 can generate the modified boundaries 702a-e by clipping any portion of each of the initial boundaries 502a-e that exceeds a respective clipping distance. A respective clipping distance can include a distance from the center of a selectable object to an edge of a respective clipping polygon. The selection areas delineated by the modified boundaries 702a-e can allow a user to provide a touch input or other input to the graphical interface 302 that causes a nearest selectable object within a radius of tolerance to be selected.

The radius of tolerance can be a configurable radius of a clipping polygon having a shape that is circular or approximately circular (e.g., a polygon for which the distance to each vertex is constant, such as, but not limited to, a twelve-sided polygon). A touch input, a click input, or other input received within the clipping polygon can be captured to trigger an event in response to the input (e.g., a pop-up or other interaction). The radius of tolerance can be modified to increase or decrease a tolerance (i.e., a size of a selection area). For example, the radius of tolerance can be increased to provide additional tolerance for touch devices or decreased to reduce the tolerance for a devices in which a mouse or other input device other than a touch screen is to be used. In some embodiments, the configurable radius of tolerance can be configured by a developer working with the graphics module 216. In other embodiments, the configurable radius of tolerance can be automatically configured by the graphics module 216 without requiring selection of the radius by a developer.

Some of the modified boundaries 702a-e may be coextensive with the corresponding clipping polygons 602a-e. For example, the distance from the selectable object 304b to each point along the initial boundary 502b may exceed the clipping distance providing by the clipping polygon 602b. Clipping the initial boundary 502b based on the clipping polygon 602b may provide the modified boundary 702b that is coextensive based on the clipping polygon 602b. Clipping the initial boundary 502b based on the clipping polygon 602b can remove the shared boundary regions 504b, 504d.

Some of the modified boundaries 702a-e may include portions of shared boundary regions 504a-g. For example, clipping the initial boundary 502a can remove the shared boundary regions 504b, 504c. A shared boundary region 704a common to modified boundaries 702a, 702e can include a portion of the shared boundary region 504a. The shared boundary region 704a can include the portion of the shared boundary region 504a enclosed by an overlapping of the clipping polygons 602a, 602e.

As depicted in FIG. 7, clipping the initial boundaries 502c, 502d can remove the shared boundaries 504f, 504g. A shared boundary region 704b common to modified boundaries 702c, 702d can include a portion of the shared boundary region 504e. The shared boundary region 704e can include the portion of the shared boundary region 504e enclosed by an overlapping of the clipping polygons 602c, 602d.

The initial boundaries 502a-e, the clipping polygons 602a-e, and the modified boundaries 702a-e are depicted in the figures discussed above for illustrative purposes. In some embodiments, the graphics module 216 can identify, modify, or otherwise use one or more of the initial boundaries 502a-e, the clipping polygons 602a-e, and the modified boundaries 702a-e without the initial boundaries 502a-e, the clipping polygons 602a-e, and/or the modified boundaries 702a-e being rendered for display with the graphical interface 302. In other embodiments, one or more of the initial boundaries 502a-e, the clipping polygons 602a-e, and/or the modified boundaries 702a-e can be rendered by a graphics module 216. For example, a development environment used to generate, modify, or otherwise use the electronic content 214 may be used to determine an optimal or preferred clipping distance by rendering one or more of the initial boundaries 502a-e, the clipping polygons 602a-e, and the modified boundaries 702a-e for development or testing purposes.

Figure 8:
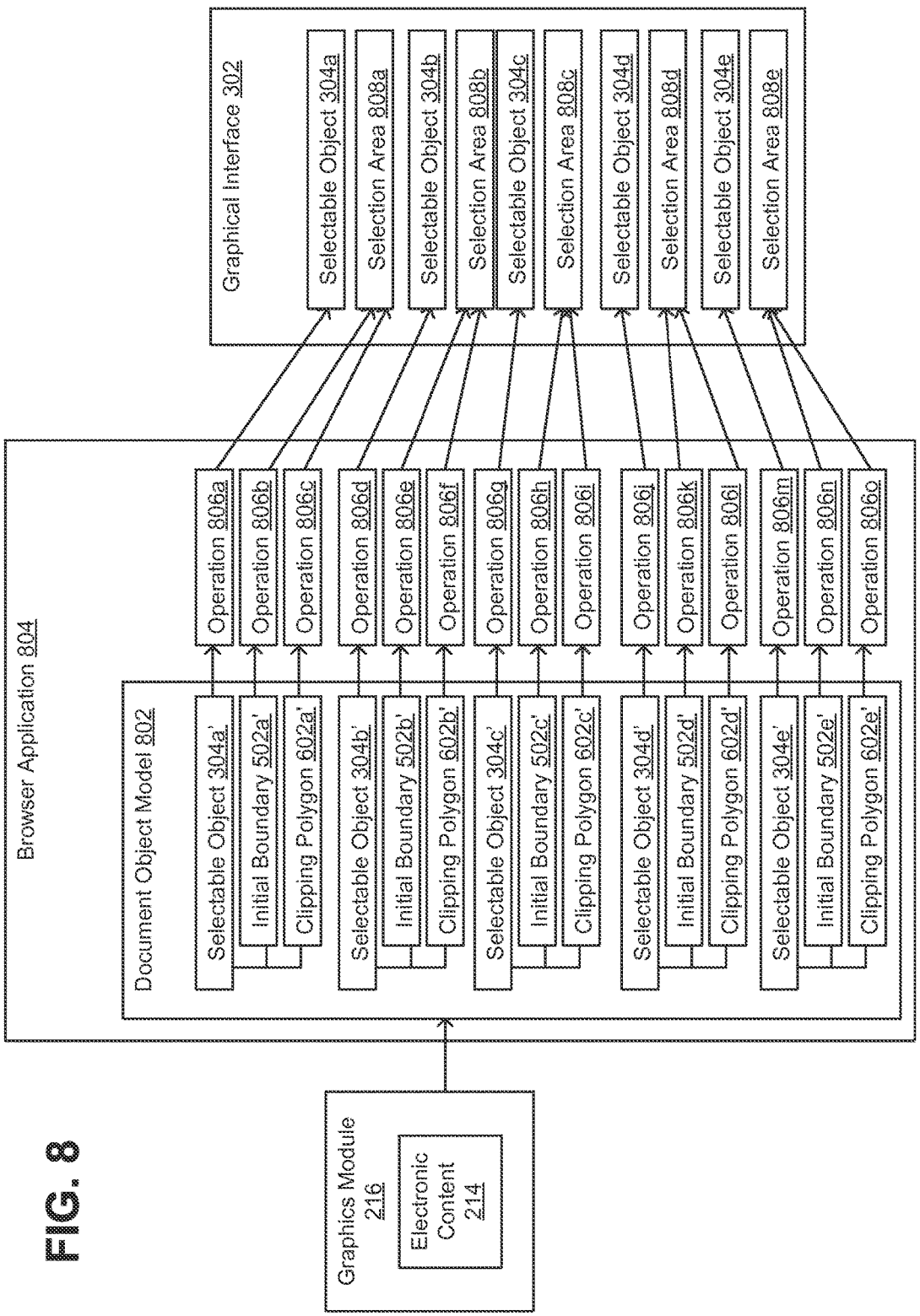
FIG. 8 is a modeling diagrams depicting a graphics module generating a document object model for a browser application to generate a graphical interface with selectable objects having selection areas.
Figure 9:
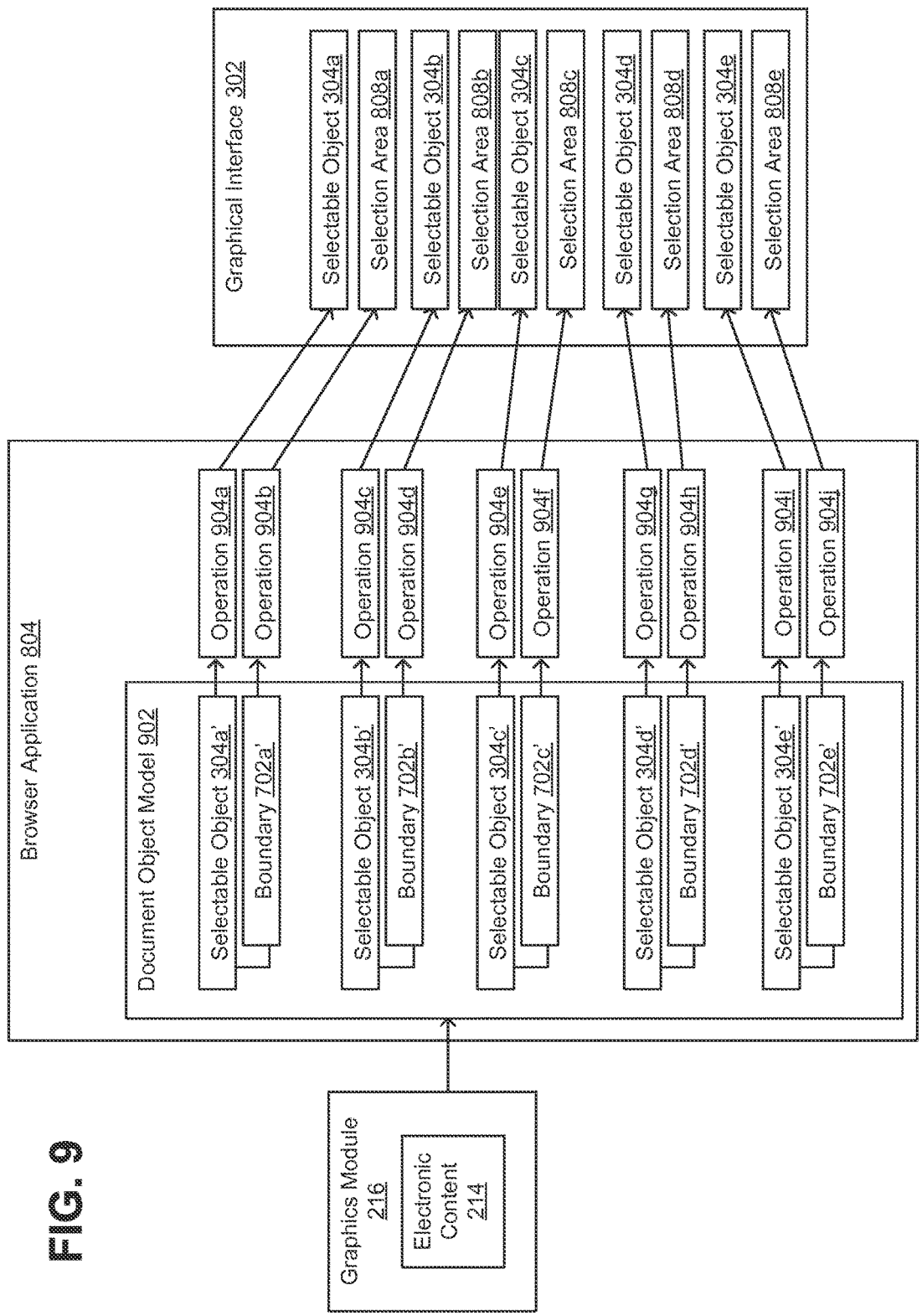
FIG. 9 is a modeling diagram depicting a graphics module generating a document object model for a browser application to generate a graphical interface with selectable objects having selection areas.

FIGS. 8-9 are modeling diagrams depicting a graphics module 216 generating document object models for a browser application 804 to generate a graphical interface 302 with selection areas for the selectable objects 304a-e.

As depicted in FIG. 8, the graphics module 216 can generate a document object model 802 for the electronic content 214. The document object model 802 can include selectable object elements 304a'-e', initial boundary elements 502a'-e', and clipping polygon elements 602a'-e'. The document object model 802 can associate the initial boundary elements 502a'-e' and the clipping polygon elements 602a'-e' with the selectable object elements 304a'-e', respectively.

The browser application 804 can generate the graphical interface 302 by parsing the document object model 802. For example, the browser application 804 can perform operation 806a for rendering the selectable object 304a in response to parsing the selectable object element 304a'. The browser application 804 can provide a selectable area 808a by performing operation 806b for identifying an initial boundary 502a in response to parsing the initial boundary element 502a' and performing operation 806b for clipping the initial boundary 502a based on the clipping polygon 602a in response to parsing the clipping polygon element 602a'. The browser application 804 can likewise render the selectable objects 304b-e by respectively performing operations 806d, 806g, 806j, 806m in response to parsing the selectable object elements 304b'-e'. The browser application 804 can likewise provide the selection areas 808b-e by respectively performing operations 806e, 806h, 806k, 806n in response to parsing the initial boundary elements 502b'-e' and respectively performing operations 806f, 806i, 806l, 806o in response to parsing the clipping polygon elements 602b'-e'.

The embodiment depicted in FIG. 8 can involve the browser application 804 performing clipping operations to provide the selection areas during the process of rendering the graphical interface 302. The browser application performing the clipping operations during the rendering process can utilize resources (such as, but not limited to, memory capacity and/or processing capacity) that may be limited in devices such as smart phones and other mobile computing devices. Performing clipping operations via Javascript or another suitable graphical interface library prior to performing the rendering process can reduce the resource requirements associated with providing the selection areas.

For example, FIG. 9 depicts the graphics module 216 generating a document object model 902 that includes selectable object elements 304a'-e' for the selectable objects 304a-e and boundary elements 702a'-e' for the modified boundaries 702a-e. The graphics module 216 can execute Javascript code or code from another suitable graphical interface library to output the boundary elements 702a'-e'. The graphics module 216 can generate or modify the document object model 902 to include the boundary elements 702a'-e'. The browser application 804 can generate the graphical interface 302 having the selectable objects 304a-e and the selection areas 808a-e by performing operations 904a-j in response to parsing the selectable objects 304a-e and boundary elements 702a'-e'. Performing the operations 904b, 904d, 904f, 904h, 904j for identifying the modified boundaries 702a-e may utilize fewer memory and/or processing resources as compared to both performing operations 806b, 806e, 806h, 806k, 806n for identifying the initial boundaries 502a-e and performing operations 806c, 806f, 806i, 806l, 806o for clipping the initial boundaries 502a-e using the clipping polygons 602a-e.

For example, FIG. 8 depicts three elements (i.e., a selectable object, an initial boundary, and a clipping polygon) in the document object model 802 for each of the selectable objects 304a-e. Additional processing can be introduced by adding the clipping polygons 602a'-e' to the document object model 802 depicted in FIG. 8. Processing of the document object model 802 can involve allocating memory for the clipping polygons 602a'-e', adding the clipping polygons 602a'-e' to a scene graph (i.e., the HTML hierarchy), parsing the scene-graph in order to render the clipping polygons 602a'-e', and applying the clipping polygons 602a'-e'. FIG. 9 depicts two elements (i.e., a selectable object and a boundary) in the document object model 902 for each of the selectable objects 304a-e. The implementation depicted in FIG. 9 can reduce or eliminate the operations of allocating memory for the clipping polygons 602a'-e', adding the clipping polygons 602a'-e' to the scene graph, parsing the clipping polygons 602a'-e' of the scene graph, and applying the clipping polygons 602a'-e'. Eliminating these operations can reduce the amount of processing resources associated with the browser application providing the graphical interface 302.

Figure 10:
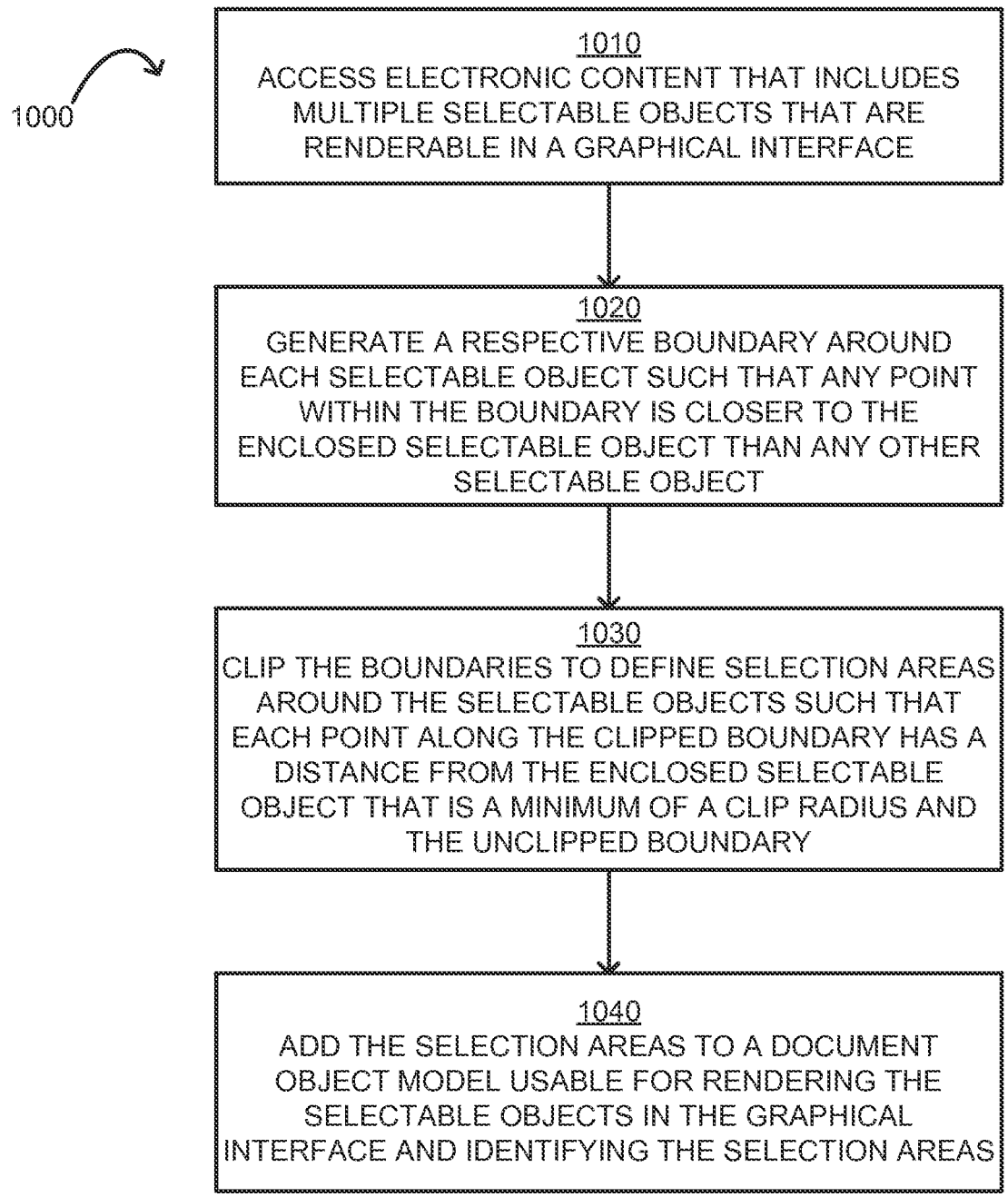
FIG. 10 is a flow chart illustrating an example method for providing selection areas for selectable objects in a graphical interface.

FIG. 10 is a flow chart illustrating an example method 1000 for providing selection areas for selectable objects in a graphical interface. For illustrative purposes, the method 1000 is described with reference to the system implementation depicted in FIG. 2. Other implementations, however, are possible.

The method 1000 involves accessing electronic content 214 that includes multiple selectable objects 304a-e that are renderable in a graphical interface 302, as shown in block 1010. The processor 204 of the computing system 202 can execute the graphics module 216 or other suitable programming instructions to access the electronic content 214.

The method 1000 further involves generating initial boundaries 502a-e around the respective selectable objects 304a-e such that any point within each of the initial boundaries 502a-e is closer to the enclosed selectable object than any other selectable object, as shown in block 1020. The processor 204 of the computing system 202 can execute the graphics module 216 or other suitable programming instructions to generate the initial boundaries 502a-e. In some embodiments, generating the initial boundaries 502a-e can include applying a Voronoi tessellation to a portion of the graphical interface 302 in which selectable objects 304a-e are positioned as described above with respect to FIG. 5.

The method 1000 further involves clipping the initial boundaries 502a-e to define selection areas around the selectable objects 304a-e, as shown in block 1030. The processor 204 of the computing system 202 can execute the graphics module 216 or other suitable programming instructions to clip the initial boundaries 502a-e.

In some embodiments, each point along each of the clipped boundaries 702a-e has a distance from the enclosed selectable object that is a minimum of a clipping distance and the unclipped boundary. The clipping distance may be, for example, a clipping radius that is the radius of a circle used to clip the boundaries 502a-e.

In other embodiments, the clipped boundaries can be obtained by applying the clipping polygons 602a-e to the initial boundaries 502a-e. Clipping an initial boundary using a clipping polygon can include positioning each point along the boundary at a distance from the selectable object that is a minimum of a distance from the selectable object to the boundary and the distance from the selectable object to the edge of the clipping polygon, as described above with respect to FIG. 6-7.

In some embodiments, the number of vertices for the clipping polygons 602a-e can be adjustable. In some embodiments, the number of vertices can be adjusted based on input received to the graphics module 216. In other embodiments, the clipping distance can be automatically adjusted without requiring input specifying the number of vertices. For example, the processor 204 can determine the computing resources (e.g., processing capacity and/or memory capacity) available for performing the clipping operations. The processor 204 can execute the graphics module 216 to increase the number of vertices based on the computing system 202 having a higher processing capacity and/or memory capacity. For example, if sufficient processing resources are available or a data-set of selectable objects is relatively small, the number of vertices can be increased to enhance the resolution of each clipping polygon. Increasing the number of vertices can increase the circular nature of a selection area for a selectable object. If processing resources are limited or a data-set of selectable objects is relatively large, the number of vertices can be reduced to allow clipping operations to be performed efficiently for each selectable object and increase the speed at which the graphical interface is rendered.

In some embodiments, the clipping distance can be adjustable. In some embodiments, the clipping distance can be adjusted based on input received to the graphics module 216. For example, in a development environment used to generate or modify electronic content 214 or a graphics module 216, a development interface may be presented to a developer that elicits input specifying the length of the clipping distance. In other embodiments, the clipping distance can be automatically adjusted without requiring input specifying the length of the clipping distance. For example, the processor 204 can determine the attributes of a display device 212 on which the graphical interface 302 is to be displayed. Non-limiting examples of such attributes include the resolution of the display device 212 and/or the dimensions of the display device 212. The graphics module 216 can increase the length of the clipping distance for higher resolutions and/or larger dimensions or decrease the length of the clipping distance for lower resolutions and/or smaller dimensions.

The method 1000 further involves adding the selection areas to a document object model usable for rendering the selectable objects 304a-e in the graphical interface 302 and identifying the selection areas, as shown in block 1040. The processor 204 of the computing system 202 can execute the graphics module 216 or other suitable programming instructions to adding the selection areas to a document object model. For example, the graphics module 216 can generate and/or modify a document object model 902 having elements for the modified boundaries 702a-e, as described above with respect to FIG. 9.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
generating, by a processing device, a plurality of selection areas configured for respectively selecting a plurality of selectable objects in a graphical interface, wherein generating the plurality of selection areas comprises, for a first selectable object and a second selectable object of the plurality of selectable objects:
generating a first boundary around the first selectable object and a second boundary around the second selectable object, wherein any point within the first boundary is closer to the first selectable object than any other selectable object of the plurality of selectable objects other than the second selectable object, wherein any point within the second boundary is closer to the second selectable object than any other selectable object of the plurality of selectable objects other than the first selectable object,
identifying an overlapping portion of the first boundary and the second boundary, and
clipping the first boundary and the second boundary to define a first selection area for the first selectable object and a second selection area for the second selectable object, wherein defining the first selection area and the second selection area removes the overlapping portion; and
modifying, by the processing device, a document object model stored in a non-transitory computer-readable medium to include the plurality of selection areas, wherein the modified document object model that is usable for rendering the plurality of selectable objects in the graphical interface.

2. The method of claim 1, wherein, for each boundary of the first boundary and the second boundary, the boundary is generated by applying a Voronoi tessellation to a space in which the plurality of selectable objects are positioned, wherein a plurality of points associated with the plurality of selectable objects comprise a plurality of seed points for the Voronoi tessellation and the unclipped boundary defines at least one of a plurality of Voronoi regions.

3. The method of claim 1, wherein, for each boundary of the first boundary and the second boundary and for each selectable object of the first selectable object and the second selectable object, clipping the boundary comprises:
   accessing a clipping polygon having a fixed distance from a center of the clipping polygon to each vertex of the clipping polygon; and
   identifying at least one portion of the boundary having a first distance from the selectable object that is greater than a second distance from the selectable object to an edge of the clipping polygon; and
   modifying the at least one portion of the boundary to align with the edge of the respective clipping polygon.

4. The method of claim 3, further comprising modifying, by the processing device, the fixed distance from the center of the clipping polygon to each vertex of the clipping polygon based on an input to an additional graphical interface.

5. The method of claim 3, further comprising modifying, by the processing device, the fixed distance from the center of the clipping polygon to each vertex of the clipping polygon based on a resolution of a display device at which the graphical interface is rendered for display.

6. The method of claim 3, further comprising modifying, by the processing device, the fixed distance from the center of the clipping polygon to each vertex of the clipping polygon based on at least one dimension of a display device at which the graphical interface is rendered for display.

7. The method of claim 3, further comprising modifying, by the processing device, a number of vertices for the clipping polygon based on an input to an additional graphical interface.

8. The method of claim 1, wherein, for each boundary of the first boundary and the second boundary, clipping the boundary comprises modifying the boundary such that each point along the modified boundary is positioned at a distance from the selectable object that is a minimum of a clipping radius and a distance from the selectable object to the unmodified boundary.

9. The method of claim 1, further comprising rendering, by the processing device, the graphical interface having the plurality of selectable objects, wherein the plurality of selection areas are identified in the graphical interface as rendered.

10. The method of claim 1, wherein removing the overlapping portion prevents a shared selection area from being generated for the first selectable object and the second selectable object.

11. The method of claim 1, wherein removing the overlapping portion causes a first input to select the first selectable object based on the first input being received in a first area corresponding to the overlapping portion and located within the clipped first boundary, wherein removing overlapping portion also causes a second input to select the second selectable object based on the second input being received in a second area corresponding to the overlapping portion and located within the clipped second boundary.

12. A non-transitory computer-readable medium tangibly embodying program code executable by a processor for providing a gateway application, the program code comprising:
   program code for generating a plurality of selection areas configured for respectively selecting a plurality of selectable objects in a graphical interface, wherein generating the plurality of selection areas comprises, for a first selectable object and a second selectable object of the plurality of selectable objects:
      generating a first boundary around the first selectable object and a second boundary around the second selectable object, wherein any point within the first boundary is closer to the first selectable object than any other selectable object of the plurality of selectable objects other than the second selectable object, wherein any point within the second boundary is closer to the second selectable object than any other selectable object of the plurality of selectable objects other than the first selectable object,
      identifying an overlapping portion of the first boundary and the second boundary, and
      clipping the first boundary and the second boundary to define a first selection area for the first selectable object and a second selection area for the second selectable object, wherein defining the first selection area and the second selection area removes the overlapping portion; and
   program code for modifying a document object model stored in the non-transitory computer-readable medium or another non-transitory computer-readable medium to include the plurality of selection areas, wherein the modified document object model that is usable for rendering the plurality of selectable objects in the graphical interface.

13. The non-transitory computer-readable medium of claim 12, wherein, for each boundary of the first boundary and the second boundary, the boundary is generated by applying a Voronoi tessellation to a space in which the plurality of selectable objects are positioned, wherein a plurality of points associated with the plurality of selectable objects comprise a plurality of seed points for the Voronoi tessellation and the unclipped boundary defines at least one of a plurality of Voronoi regions.

14. The non-transitory computer-readable medium of claim 12, wherein, for each boundary of the first boundary and the second boundary and for each selectable object of the first selectable object and the second selectable object, clipping the boundary comprises:
   accessing a clipping polygon having a fixed distance from a center of the clipping polygon to each vertex of the clipping polygon; and
   identifying at least one portion of the boundary having a first distance from the selectable object that is greater than a second distance from the selectable object to an edge of the clipping polygon; and
   modifying the at least one portion of the boundary to align with the edge of the respective clipping polygon.

15. The non-transitory computer-readable medium of claim 14, further comprising program code for modifying the fixed distance from the center of the clipping polygon to each vertex of the clipping polygon based on an input to an additional graphical interface.

16. The non-transitory computer-readable medium of claim 14, further comprising program code for modifying the fixed distance from the center of the clipping polygon to each vertex of the clipping polygon based on a resolution of a display device at which the graphical interface is rendered for display.

17. The non-transitory computer-readable medium of claim 14, further comprising program code for modifying the fixed distance from the center of the clipping polygon to each vertex of the clipping polygon based on at least one dimension of a display device at which the graphical interface is rendered for display.

18. The non-transitory computer-readable medium of claim 14, further comprising program code for modifying a number of vertices for the clipping polygon based on an input to an additional graphical interface.

19. A system comprising:
a processor; and
a non-transitory computer-readable medium communicatively coupled to the processor;
wherein the processor is configured to execute program code embodied in the non-transitory computer readable medium, wherein executing the program code configures the process to perform operations comprising:
generating a plurality of selection areas configured for respectively selecting a plurality of selectable objects in a graphical interface, wherein generating the plurality of selection areas comprises, for a first selectable object and a second selectable object of the plurality of selectable objects
generating a first boundary around the first selectable object and a second boundary around the second selectable object, wherein any point within the first boundary is closer to the first selectable object than any other selectable object of the plurality of selectable objects other than the second selectable object, wherein any point within the second boundary is closer to the second selectable object than any other selectable object of the plurality of selectable objects other than the first selectable object,
identifying an overlapping portion of the first boundary and the second boundary, and
clipping the first boundary and the second boundary to define a first selection area for the first selectable object and a second selection area for the second selectable object, wherein defining the first selection area and the second selection area removes the overlapping portion; and
modifying a document object model stored in the non-transitory computer-readable medium or another non-transitory computer-readable medium to include the plurality of selection areas, wherein the modified document object model that is usable for rendering the plurality of selectable objects in the graphical interface.

20. The system of claim 19, wherein, for each boundary of the first boundary and the second boundary, the boundary is generated by applying a Voronoi tessellation to a space in which the plurality of selectable objects are positioned, wherein a plurality of points associated with the plurality of selectable objects comprise a plurality of seed points for the Voronoi tessellation and the unclipped boundary defines at least one of a plurality of Voronoi regions.

21. The system of claim 19, wherein, for each boundary of the first boundary and the second boundary and for each selectable object of the first selectable object and the second selectable object, clipping the boundary comprises:
accessing a clipping polygon having a fixed distance from a center of the clipping polygon to each vertex of the clipping polygon; and
identifying at least one portion of the boundary having a first distance from the selectable object that is greater than a second distance from the selectable object to an edge of the clipping polygon; and
modifying the at least one portion of the boundary to align with the edge of the respective clipping polygon.

22. The system of claim 21, further comprising program code for modifying the fixed distance from the center of the clipping polygon to each vertex of the clipping polygon based on an input to an additional graphical interface.

* * * * *